(12) United States Patent
Kim

(10) Patent No.: US 7,927,726 B2
(45) Date of Patent: Apr. 19, 2011

(54) RECHARGEABLE BATTERY

(75) Inventor: Jun Ho Kim, Asan-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1223 days.

(21) Appl. No.: 11/138,319

(22) Filed: May 27, 2005

(65) Prior Publication Data

US 2005/0266279 A1  Dec. 1, 2005

(30) Foreign Application Priority Data

May 31, 2004 (KR) .................. 10-2004-0039165

(51) Int. Cl.
*H01M 2/04* (2006.01)
*H01M 2/12* (2006.01)
*H01M 10/50* (2006.01)

(52) U.S. Cl. .................. 429/56; 429/62; 429/175

(58) Field of Classification Search .................. None
See application file for complete search history.

(56) References Cited

U.S. PATENT DOCUMENTS

2003/0157399 A1* 8/2003 Ikeuchi et al. .................. 429/62

FOREIGN PATENT DOCUMENTS

| CN | 1319902 | 10/2001 |
| CN | 1385908 | 12/2002 |
| JP | 2002-334685 | * 11/2002 |

* cited by examiner

*Primary Examiner* — Jonathan Crepeau
(74) *Attorney, Agent, or Firm* — H.C. Park & Associates, PLC

(57) ABSTRACT

The present invention discloses a rechargeable battery that has an improved mounting structure for an electrode terminal and a second protective device used therein. This improved structure improves the function of the rechargeable battery. The rechargeable battery comprises an electrode assembly that has first electrode plate, a second electrode plate, and a separator for insulating the electrode plates from each other, all of which are wound together. It also includes a can that contains the electrode assembly therein, a cap assembly that has a cap plate for sealing a top opening of the can, an electrode terminal that is insulated and inserted into a terminal through-hole formed on the cap plate, and a terminal groove formed on the top of the terminal through-hole with a shape corresponding to that of the head of the electrode terminal so that the head of the electrode terminal can be housed therein. The rechargeable battery of the present invention also includes a protective device groove spaced at a predetermined distance from the terminal groove and a second protective device housed in the protective device groove with one end connected to the top surface of the electrode terminal.

18 Claims, 6 Drawing Sheets

RECHARGEABLE BATTERY

CROSS REFERENCE TO RELATED APPLICATION

This application claims priority to and the benefit of Korean Patent Application No. 2004-0039165 filed on May 31, 2004, which is hereby incorporated by reference for all purposes as if fully set forth herein.

BACKGROUND OF THE INVENTION

1. Field of the Invention

The present invention relates to a rechargeable battery. In particular, the present invention relates to a rechargeable battery that has an improved mounting structure for an electrode terminal and a second protective device used therein that ensures the stability of the rechargeable battery.

2. Description of the Prior Art

Rechargeable batteries are being developed to power lightweight portable wireless electronic devices such as video cameras, mobile telephones, and portable computers. Commonly used rechargeable batteries include, for example, nickel cadmium batteries, nickel hydrogen batteries, nickel zinc batteries, and lithium rechargeable batteries. Lithium rechargeable batteries are widely used in cutting-edge electronics applications because they are rechargeable, they can be made in a compact size with large capacity, they have a high operation voltage, and they have a high energy density per unit weight. These properties enable lithium batteries to meet the demands of complex electronic devices that incorporate numerous functions.

A typical rechargeable battery includes an electrode assembly, which includes positive and negative electrode plates, and a separator. The electrode assembly is housed in a metallic can. An electrolyte is injected into the can, which is sealed to form a bare cell. The bare cell generally has an electrode terminal that is positioned on top of it and is insulated from the can. The electrode terminal acts as one electrode of the battery and the battery can itself as the other electrode.

After the bare cell is sealed, a safety device such as a second protective device including a positive temperature coefficient (PTC) thermistor and a protective circuit module (PCM) is connected to the top of the bare cell and is encased in a battery pack or molded with a resin to form a rechargeable battery. The safety apparatus is connected to positive and negative electrodes and interrupts electrical current when the temperature or voltage of the battery rises abruptly due to overcharge or over-discharge in order to avoid damage to the battery.

FIG. 1 is a partial sectional view showing a bare cell of a rechargeable battery according to the prior art.

The bare cell 10 of the rechargeable battery includes a can 20, an electrode assembly 22, and a cap assembly 30. The bare cell 10 may also include a second protective device 40 on the top thereof, depending on the construction of the rechargeable battery.

Referring to FIG. 1, the can 20 is a metallic container with a cuboid shape with its top open. The can 20 is preferably made of aluminum or an aluminum alloy, which is a light metal with good conductivity and excellent corrosion resistance. The can 20 comprises the electrode assembly 22, which includes a positive electrode plate 23, a separator 24, a negative electrode plate 25, and an electrolyte. After the electrode assembly 22 is inserted into the can 20 through its top opening, the top opening is sealed by the cap assembly 30.

The cap assembly 30 is provided with a planar plate-type cap plate 31 with a size and shape corresponding to those of the top opening of the can 20.

The electrode assembly 22 is formed by winding positive and negative electrode plates 23 and 25, respectively, with a separator 24 interposed between them. The positive electrode plate 23 is coupled to the cap plate 31 via a positive electrode tab 26 and the negative electrode plate 25 is coupled to a negative terminal 32 of the cap plate 31 via a negative electrode tab 27. The can 20 is electrically insulated from the negative terminal 32 and acts as a positive terminal. After the cap assembly 30 is welded to the top of the can 20, an electrolyte is injected through an electrolyte injection hole 36 of the cap plate 31. The electrolyte injection hole 36 is sealed by a cap 37 formed by press-fitting a ball.

The cap plate 31 is preferably made of the same material as the can 20, i.e., aluminum or an aluminum alloy to provide improved welding to the can 20. The cap plate 31 has a terminal through-hole formed in its center through which the negative terminal 32 can pass. A tube-shaped gasket 33 is positioned on the exterior of the negative terminal 32, which extends through the center of the cap plate 31 for electrical insulation between the negative terminal 32 and the cap plate 31. An insulation plate 34 is positioned beneath the cap plate 31 near the terminal through-hole of the cap plate 31. A terminal plate 35 is positioned beneath the insulation plate 34.

The second protective device 40 is located on the top surface of the cap plate 31 and is positioned between the negative terminal 32 and a protective circuit module (not shown in the drawing). A PTC thermistor or a thermal fuse may be used as the rechargeable protective device 40.

Conventional rechargeable batteries that are configured as discussed above have a design flaw in that the second protective device is mounted on top of the cap plate, away from the interior of the can. This results in reduced temperature sensitivity of the protective device.

In addition, the head portion of the electrode terminal protrudes from the top of the cap plate and is not flush with the second protective device. This makes it difficult to connect the second protective device to the electrode terminal. The electrode terminal may also rotate while welding or otherwise attaching the second protective device to the electrode terminal. This may weaken or even break the welded portion between the electrode terminal and the negative electrode tab.

SUMMARY OF THE INVENTION

The present invention provides a rechargeable battery with an improved mounting structure for the electrode terminal and the second protective device that are used therein. This structure helps to ensure the stability of the rechargeable battery.

Additional features of the invention will be set forth in the description which follows, and in part will be apparent from the description, or may be learned by practice of the invention.

The present invention discloses a rechargeable battery that comprises an electrode assembly that has a first electrode plate, a second electrode plate, and a separator for insulating the electrode plates from each other. The first electrode plate, the second electrode plate, and the separator are wound together. The battery also comprises a can for housing the electrode assembly therein, a cap assembly including a cap plate for sealing a top opening of the can, and an electrode terminal insulated and inserted into a terminal through-hole formed on the cap plate. The battery further comprises a terminal groove formed on top of the terminal through-hole with a shape corresponding to the head of the electrode terminal so that the head of the electrode terminal can be seated therein. The battery also includes a protective device groove that is spaced at a predetermined distance from the terminal groove, and a second protective device housed in the protective device groove with one end connected to the top surface of the electrode terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE EMBODIMENTS

Figure 1:
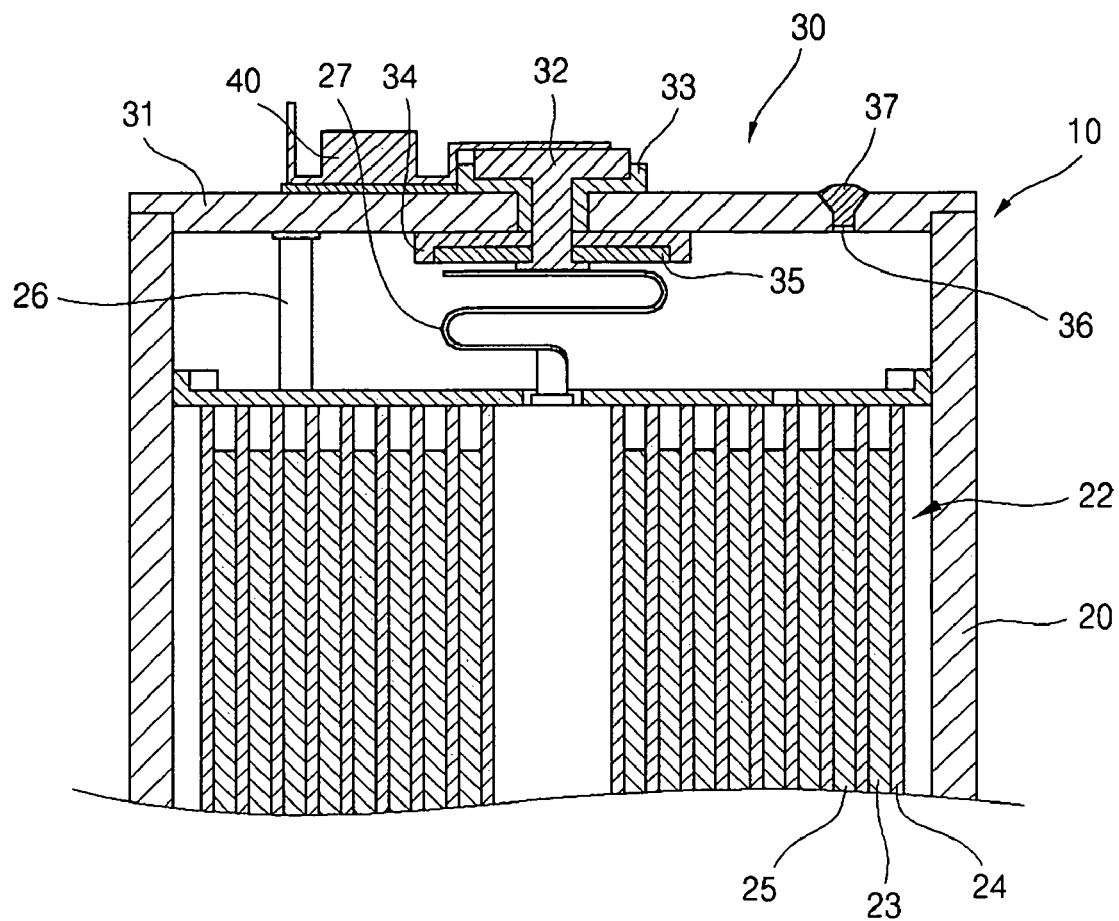
FIG. 1 is a partial sectional view showing a bare cell of a rechargeable battery according to the prior art.
Figure 2:
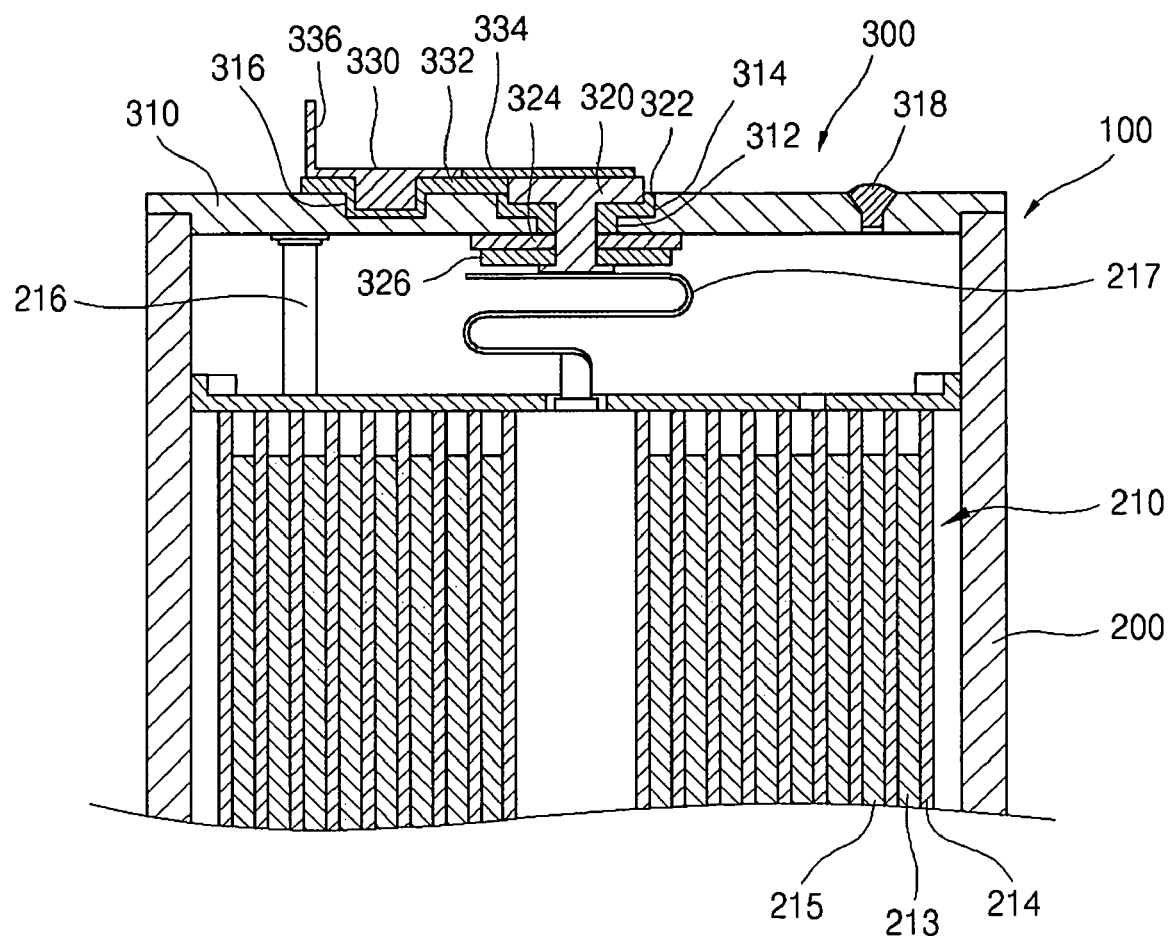
FIG. 2 is a partial sectional view showing a bare cell according to an embodiment of the present invention.
Figure 3:
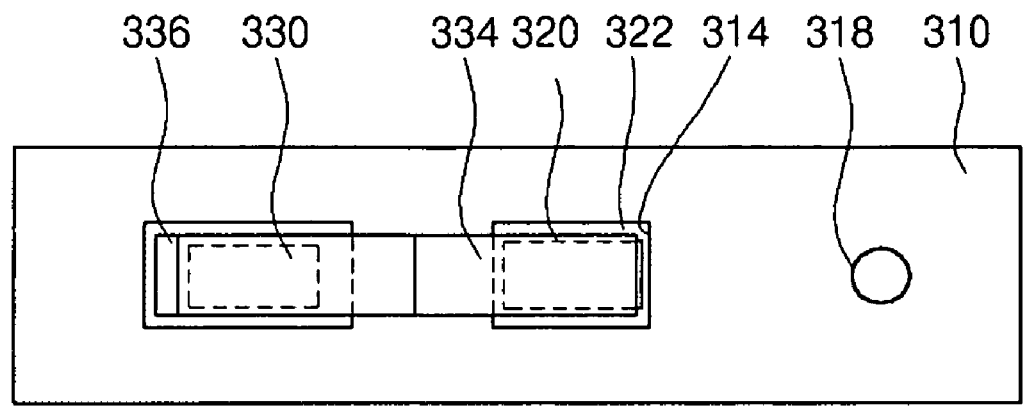
FIG. 3 is a top view of the bare cell shown in FIG. 2.

FIG. 2 is a partial sectional view that shows a bare cell according to an exemplary embodiment of the present invention and FIG. 3 is a top view of the bare cell shown in FIG. 2.

Referring to FIG. 2, a bare cell 100 of a rechargeable cell according to the present invention includes a can 200, an electrode assembly 210 contained in the can 200, a cap assembly 300 for sealing the top opening of the can 200, and a second protective device 330.

The can 200 may be made of a metal that is formed in the shape of a cuboid. The can itself can act as a terminal. The top of the can 200 is open and forms a top opening through which the electrode assembly 210 is contained in the can 200.

The electrode assembly 210 includes first and second electrode plates 215 and 213, respectively, and a separator 214. After the first and second electrode plates 215 and 213 are laminated with the separator 214 interposed between them, they may be rolled into a jelly-roll. A second electrode tab 216 is welded to the second electrode plate 213 and an end of the second electrode tab 216 protrudes toward the top of the electrode assembly 210. A first electrode tab 217 is welded to the first electrode plate 215, and an end of the first electrode tab 217 also protrudes toward the top of the electrode assembly 210. Although the first electrode plate and tab are generally configured as the negative electrode plate and tab and the second electrode plate and tab are configured as the positive electrode plate and tab, the configuration may be switched depending on the type of rechargeable batteries being fabricated.

The cap assembly 300 includes a cap plate 310, an electrode terminal 320, and a second protective device 330.

The cap plate 310 is a metallic plate that has a size and shape that corresponds to the top opening of the can 200. The cap plate 310 has a terminal through-hole 312 formed at the center thereof with a predetermined size so that the electrode terminal 320 can be inserted therein. The terminal through-hole 312 has a terminal groove 314 formed on the top thereof with a shape corresponding to the head of the electrode terminal 320. The terminal groove 314 preferably has the shape of a square since the head of electrode terminal 320 has the shape of a square post.

The cap plate 310 has a second protective device groove 316 formed on its top surface at a predetermined distance from the terminal groove 314 so that the second protective device 330 can be inserted and fixed therein. A groove insulation plate 332 is positioned in the second protective device groove 316 to insulate the second protective device 330 seated in the second protective device groove 316 from the cap plate 310.

The electrode terminal 320 is inserted and placed in the terminal through-hole 312 and the terminal groove 314. The first electrode tab 217 of the electrode assembly 210 is welded to the bottom surface of the electrode terminal 320 and the second electrode tab 216 of the electrode assembly 210 is welded to the other side of the cap plate 310. In this configuration, the electrode terminal 320 is a negative terminal. However, the electrode terminal 320 may also be configured as a positive terminal to be connected the second electrode tab 216, depending on the position.

The head portion of the electrode terminal 320 is preferably in the shape of a square. When the electrode terminal 320 is inserted into the terminal through-hole 312, the head portion is placed in the terminal groove 314 and fixed to it. As the electrode terminal 320 is assembled to the terminal groove 314 in this manner, the electrode terminal 320 cannot be rotated, e.g., in a process for welding the second protective device 330. This prevents the first electrode tab 217 that is welded to the bottom of the electrode terminal 320 from being deformed or the welded portion of the first electrode tab 217 from being weakened.

The electrode terminal 320 is provided with a tube-shaped gasket 322 for insulation from the cap plate 310. A terminal plate 326 is positioned beneath the cap plate 310 and is electrically connected to the bottom surface of the electrode terminal 320. An insulation plate 324 is provided to electrically insulate the terminal plate 326 and the electrode terminal 320 from the cap plate 310. The insulation plate 324 may be made of an insulation tape such as a polypropylene (PP) tape.

Referring to FIG. 2, the second protective device 330 is housed in the second protective device groove 316 and is formed on the top surface of the cap plate 310. An end of the second protective device 330 is coupled to the electrode terminal 320 via a terminal lead wire 334 and the other end is coupled to a protective circuit module (not shown in the drawing) via a connection lead wire 336. As such, the coupling of the second protective device 330 is easily performed at the same level with the electrode terminal 320. This also makes it easy to form a pack because the second protective device 330 does not protrude from the electrode terminal 320. As the second protective device 330 is positioned near the interior of the can 200, it can sense the temperature inside the can 200 more effectively.

A device that is capable of adjusting the flow of electric current according to ambient temperature is used as the second protective device 330; preferably a PTC thermistor, a thermal fuse, or a thermal breaker is used.

The PTC thermistor adjusts the flow of electric current by increasing its resistance as ambient temperature rises. A complex system using composite material composed of resin, such as styrene butadiene rubber (SBR), and carbon powder or an oxide made of barium titanate is generally used as the PTC thermistor, but the material is not limited herein. In order to minimize its thickness, the PTC thermistor is preferably a complex system thermistor fabricated by forming carbon powder and resin as a thin film between upper and lower plates. As the temperature in the complex system thermistor rises, the resin expands, the contact among carbon powder is partially lost and internal resistance increases.

The PTC thermistor has one end connected to the electrode terminal 320 via the terminal lead wire 334 and another end connected to the protective circuit module via the connection lead wire 336. As the internal temperature of the battery rises, the PTC thermistor increases its internal resistance and reduces the flow of electric current between the protective circuit module and the electrode terminal 320.

The thermal fuse is generally made of a tin alloy that includes tin as a main component, and is formed as a thin film for increased temperature sensitivity. The thermal fuse is made of a tin alloy including 70-90% of tin (Sn), 5-10% of zinc (Zn), 1-4% of lead (Pb), and the balance of another metal. For example, the thermal fuse may be made of an alloy comprising 22% tin, 28% lead, and 50% bismuth.

The thermal fuse has one end connected to the electrode terminal 320 via the terminal lead wire 334 and another end connected to the protective circuit module via the connection lead wire 336. The thermal fuse is electrically insulated from the cap plate. If the internal temperature of the battery reaches a predetermined value, the thermal fuse melts and is cut, and this interrupts the flow of electrical current. It is preferred to design and adjust the components of the thermal fuse in such a manner that it is actuated in the range of 90-100° C., considering the normal operating temperature and temperature of the manufacturing process of the battery. If it is actuated below 90° C., it may melt in the aging process during the manufacture of the rechargeable battery. If it is actuated above 100° C., it may fail to effectively prevent an explosion of the rechargeable battery when it is overheated.

The thermal fuse is mounted in the protective device groove 316 as thin film and preferably includes a polyethylene or polyurethane film for insulation from the exterior.

Figure 4:
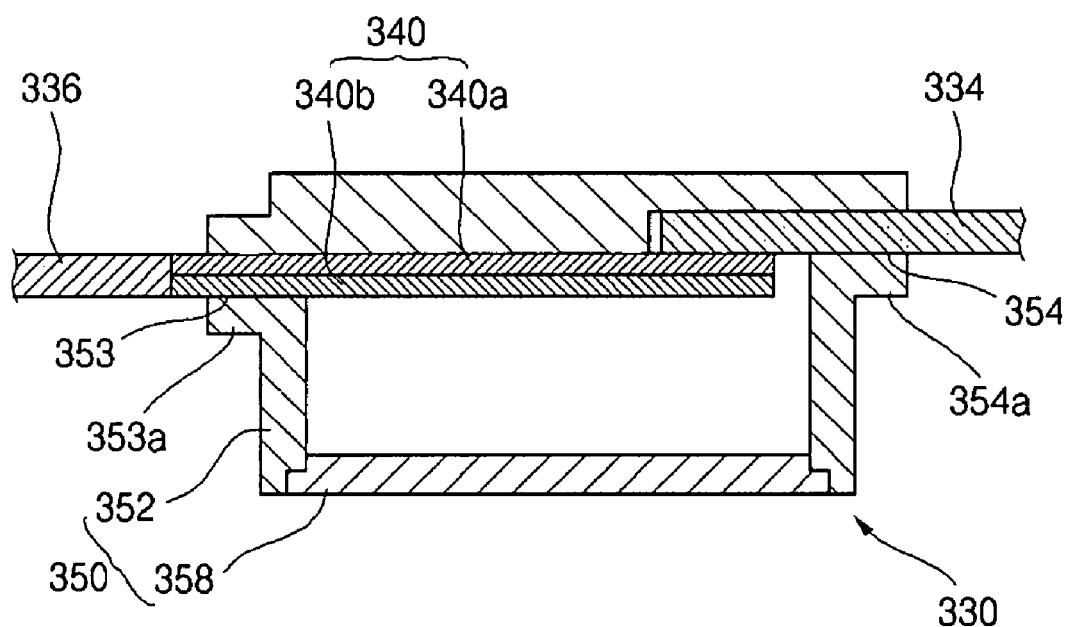
FIG. 4 is a sectional view of a thermo-breaker used as a second protective device in the present invention.

FIG. 4 is a sectional view of a thermo-breaker used as a second protective device in the present invention. As shown in FIG. 4, a thermal breaker that is used as the second protective device 330 includes a bimetal 340 and a case 350 for housing the bimetal 340 and is inserted into the protective device groove 316 to be fixed.

The bimetal 340 is formed by bonding two kinds of metal foils that have different expansion coefficients (the degree of expansion of metal with respect to temperature). The bimetal 340 deforms toward the metal that has a smaller expansion coefficient as temperature increases. In the present embodiment, metal 340a, which has a larger expansion coefficient, is positioned on top of metal 340b, which has a smaller expansion coefficient. Consequently, the bimetal, which is positioned in the horizontal direction, deforms downward, i.e., toward the metal 340b, as temperature rises.

The bimetal 340 may be made of various metal foils that are bound together. The metal 340a with a larger expansion coefficient may be made of an alloy of copper and zinc, an alloy of nickel, manganese, and iron, an alloy of nickel, chromium, and iron, or an alloy of nickel, manganese, and copper, for example. The metal 340b with a smaller expansion coefficient may be made of an alloy of nickel and iron which has low electrical conductivity, for example. For a good response at lower temperatures, the bimetal is preferably made of an alloy of nickel, manganese, and iron and an alloy of nickel and iron, which are bound together.

The bimetal 340 is preferable 0.1-1.0 nm thick. If the bimetal 340 is too thin, it is difficult to position the bimetal 340 horizontally and the contact with the terminal lead wire 334 may become unstable. If the bimetal 340 is too thick, it may become insensitive to temperature changes and thus fail to function properly.

One end of the bimetal 340 is connected to the electrode terminal 320 via the terminal lead wire 334. The other end of the bimetal 340 is connected to the protective circuit module via the connection lead wire 336.

The case 350 includes a case body 352 and a cover 358. The case body 352 has a box shape with an open bottom. It also has a bimetal hole 353 and a terminal lead wire hole 354 formed on top of both lateral surfaces through which the bimetal 340 and the terminal lead wire 334 extend to be fixed. The bimetal hole 353 and the terminal lead wire hole 354 have reinforced portions 353a and 354a, respectively, that extend at a predetermined length from the exterior of the case 350 in order to hold the bimetal 340 and the terminal lead wire 334 and to prevent them from moving up and down. The case body 352 preferably has a step formed on the inner surface of the top so that the bimetal 340 and the terminal lead wire 334 can be placed in predetermined positions.

The case 350 is made of material that has resistance to an electrolyte, including, but not limited to, polypropylene, polyimide, polyphenylene sulfide, and nylon 66.

The bimetal 340 and the terminal lead wire 334 are preferably fixed to the bimetal hole 353 and the terminal lead wire hole 354, respectively, with an adhesive. Specifically, the gap between the bimetal 340 and the bimetal hole 353 and the gap between the terminal lead wire 334 and the terminal lead wire hole 354 are sealed by an adhesive to prevent moisture from flowing into the case. Alternatively, the bimetal 340 and the terminal lead wire 334 may be molded together when molding the case body 352. The bimetal 340 and the terminal lead wire 334 are coupled with each other and if moisture flows into the case 350, the electrolyte may be applied to the surface of the bimetal 340 or the surface of the terminal lead wire 334 and make the contact between them unstable.

The cover 358 is coupled to the bottom of the case body 352 and seals the interior of the case 350.

Figure 6:
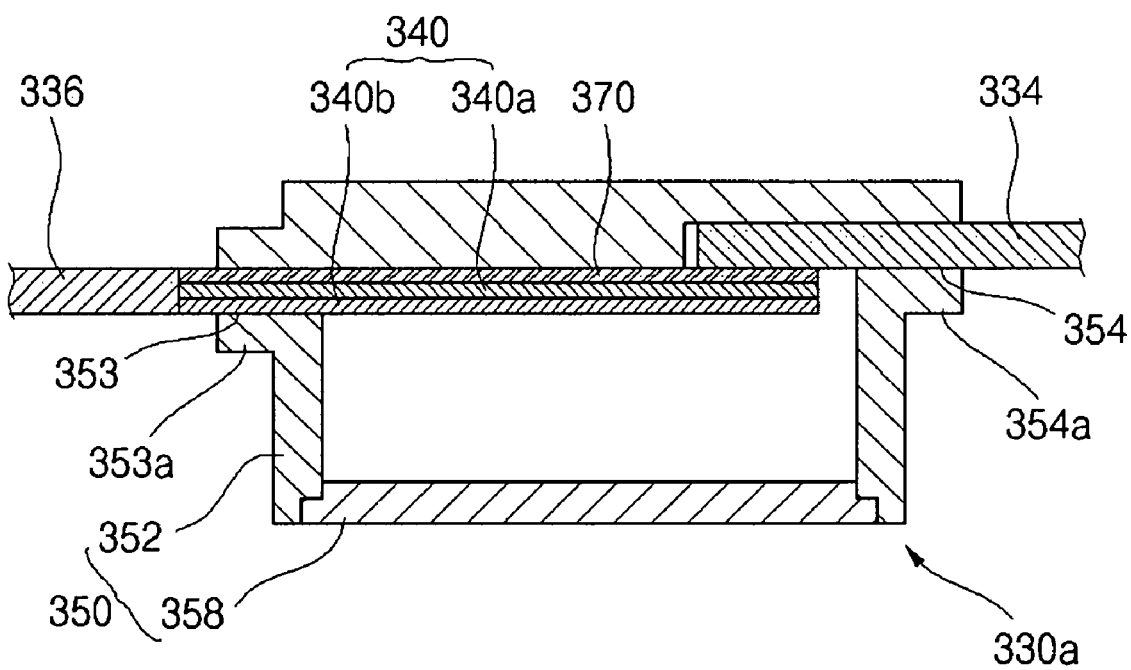
FIG. 6 is a sectional view showing a thermo-breaker according to another embodiment of the present invention.

FIG. 6 shows a thermo-breaker according to another exemplary embodiment of the present invention. Referring to FIG. 6, a thermo-breaker 330a has an additional thin conductive plate 370 positioned on top of a bimetal 340. The conductive plate 370 is made of metal that has low electrical resistance, such as copper, nickel, aluminum, and silver. The bimetal plates 340a and 340b are the same as in FIG. 4. Accordingly, the conductive plate 370, which is positioned on top of the bimetal 340 and has excellent electrical conductivity, minimizes the loss of electrical current due to the electrical resistance of the bimetal 340. In other words, the conductive plate 370 conducts electrical current between a terminal lead wire 334 and a connection lead wire 336 with minimized electrical resistance.

Figure 5:
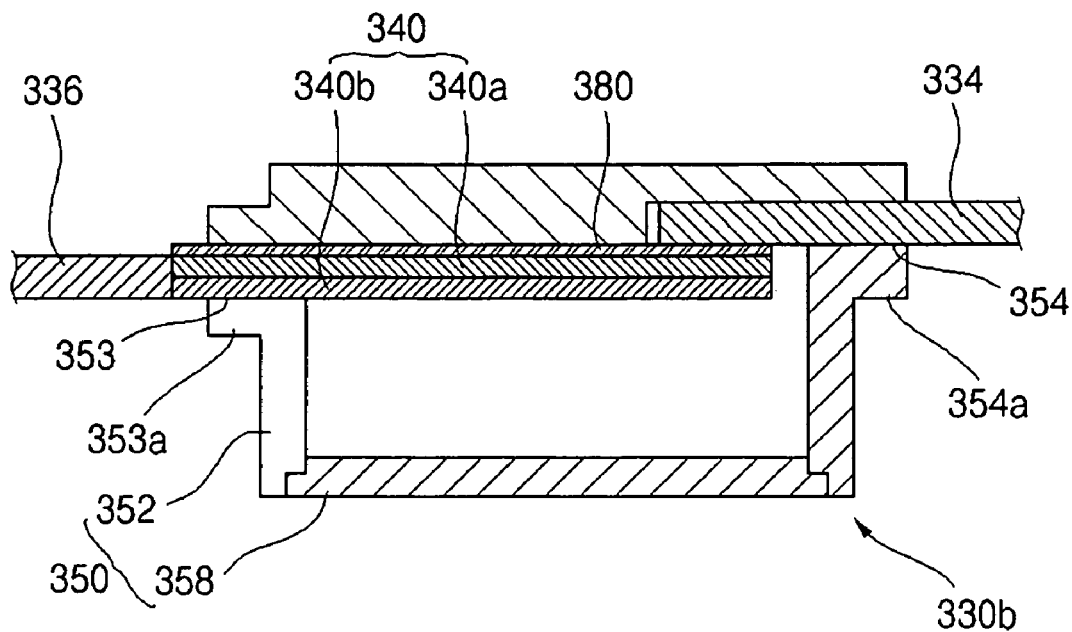
FIG. 5 is a sectional view showing a thermo-breaker according to another embodiment of the present invention.

FIG. 5 shows another exemplary embodiment of the present invention. Referring to FIG. 5, a thermo-breaker 330b has an additional PTC ceramic thermistor 380 on top of a bimetal 340. The PTC ceramic thermistor 380 is preferably made of a ceramic device including barium titanate-based material. As temperature changes, resistance of the PTC ceramic thermistor 380 increases and resistance heat is generated. If the temperature change inside the can disappears, the bimetal 340 returns to original position and makes a contact with a terminal lead wire 336. Electrical currents then flow through the rechargeable battery again. However, when the rechargeable battery has not been normalized yet, it takes some time until the temperature inside the can reaches a point at which the bimetal 340 functions. During that period of time, electrical currents can flow through the rechargeable battery. This affects the electrode assembly and the protective circuit of the rechargeable battery and shortens the service life.

As the PTC ceramic thermistor 380 generates resistive heat according to temperature change, the temperature of the bimetal 340 quickly rises which actuates the bimetal 340 rapidly. This allows the period of time during which electrical current flows through the rechargeable battery to be minimized, thus avoiding any damage to the electrode assembly or the protective circuit, and preventing the service life of the rechargeable battery from being shortened. The PTC ceramic thermistor 380 may also be positioned beneath the bimetal 340 or a terminal lead wire 334.

Figure 7:
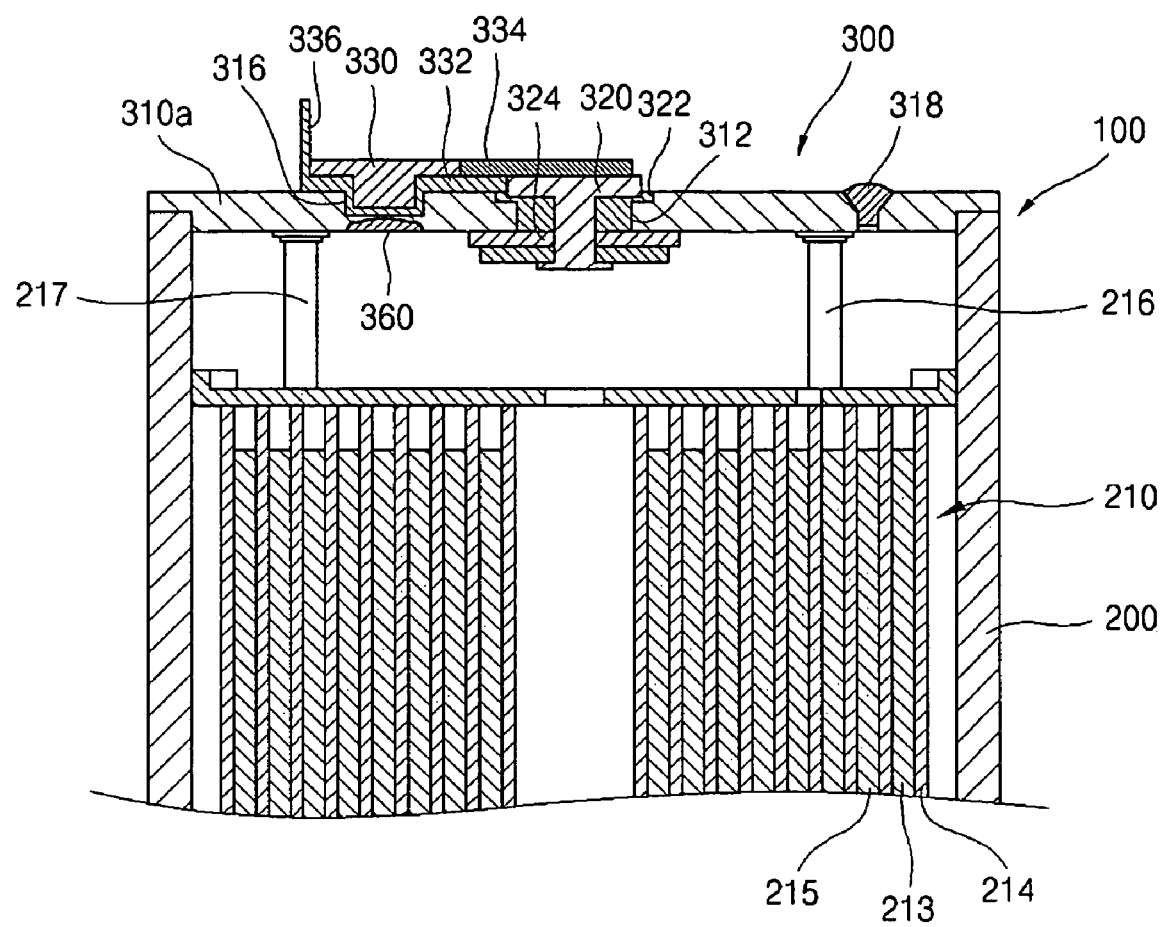
FIG. 7 is a partial sectional view showing a bare cell according to another embodiment of the present invention.

FIG. 7 shows another exemplary embodiment of the present invention. Referring to FIG. 7, a cap plate 310a additionally has a safety vent 360 that is formed below a protective device groove 316. The safety vent 360 is concave from the bottom surface of the cap plate 310a toward the top. It functions by opening to discharge excess gas that causes an increase in the internal pressure of the rechargeable battery. The presence of the safety vent 360 allows for a thinner portion of the cap plate 310a. This results in an improved heat transfer to the second protective device 330 because the second protective device 330 can sense a temperature change inside a can 200 more quickly.

When the safety vent 360 is formed on the bottom of the second protective device 330, it is possible to prevent the safety vent 360 from being damaged by injection pressure during resin molding process. More specifically, when a protective circuit module (not shown in the drawing) is connected to the top of a bare cell 100 and is molded with a resin, the second protective device 330 prevents the injection pressure of the resin from being directly transmitted to the safety vent 360. As a result, any damage to the safety vent is avoided.

Figure 8:
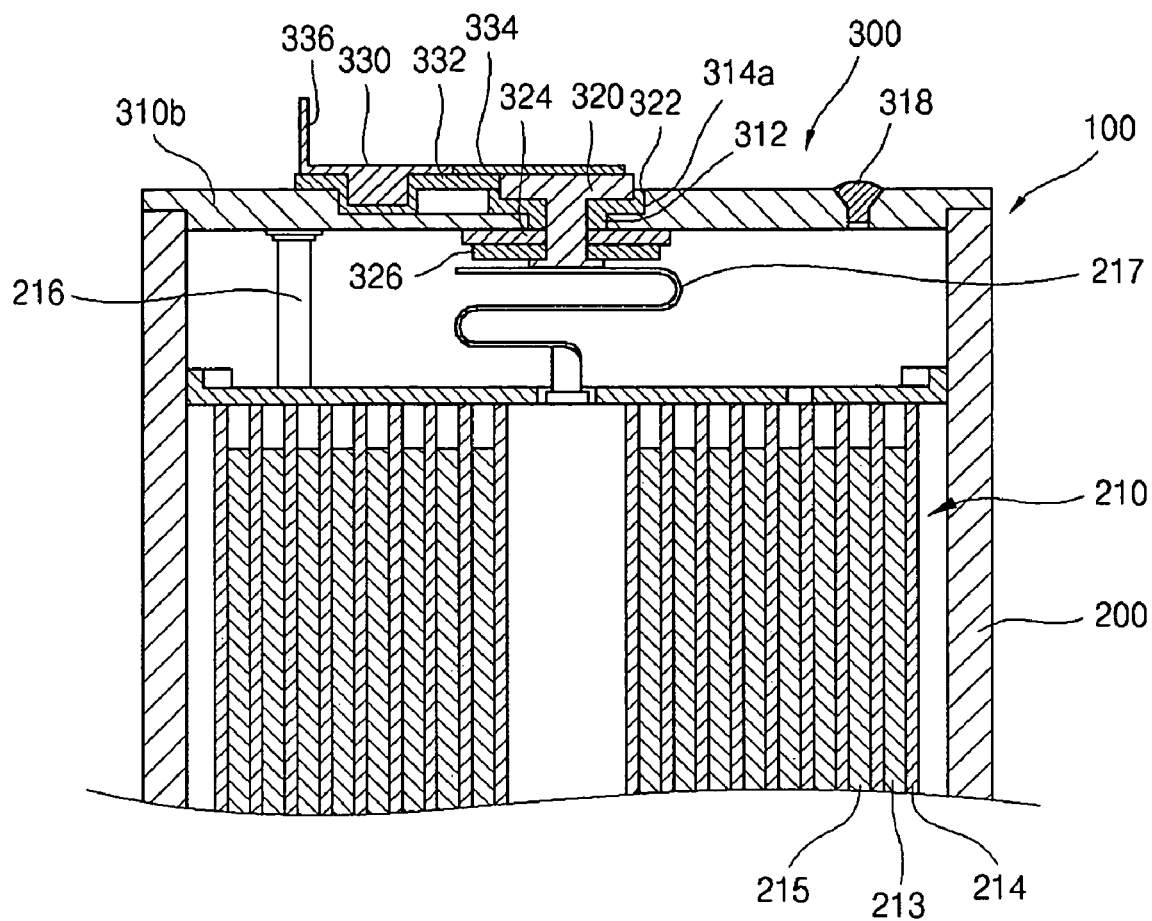
FIG. 8 is a partial sectional view showing a bare cell according to another embodiment of the present invention.

FIG. 8 shows another exemplary embodiment of the present invention. Referring to FIG. 8, a cap plate 310b has a terminal groove 314a formed on top of a terminal through-hole 312 while extending a predetermined distance toward the other side. Specifically, the terminal groove 314 shown in FIG. 2 and the protective device groove 316 spaced at a predetermined distance from the terminal groove 314 are combined into a single terminal groove 314a. Accordingly, an electrode terminal 320 is housed on a side of the terminal groove 314a and a second protective device 330 is housed on the other side of the terminal groove 314a and are spaced a predetermined distance.

One end of the second protective device 330 is coupled to the electrode terminal 320 via a terminal lead wire 334 and the other end is coupled to a protective circuit module (not shown in the drawing) via a connection lead wire 336. A protective device insulation plate 332 is positioned beneath the second protective device 330 to insulate the second protective device 330 from the cap plate 310b. As such, the terminal groove 314a of the cap plate 310b is enough to seat the electrode terminal 320 and the second protective device 330 thereon. This makes it easy to form the terminal groove 314a.

The operation of the safety features of the rechargeable battery according to the present invention will now be described.

When the rechargeable battery according to the present invention undergoes an overcharge or an over-discharge, the temperature inside the battery rises. If the temperature inside the battery reaches a predetermined value, the second protective device 330 between the electrode terminal 320 and the protective circuit module quickly interrupts the electric current between them. This eliminates the typical problems associated with overcharge or over-discharge of the rechargeable battery such as preventing the explosion of the battery due to an excessive pressure increase inside the battery or other malfunctions of the battery, thus guaranteeing the safety of the rechargeable battery.

When a protective circuit module is connected to the top of the bare cell and is molded with a resin, the second protective device prevents the injection pressure of the resin from being directly released to the safety vent. As a result, any damage to the safety vent is also avoided.

When it is mounted, the second protective device 330 is not higher than the electrode terminal 320. This makes it possible to reduce the height of the rechargeable battery and to easily form a pack. In addition, since the electrode terminal and the second protective device are seated in a single groove and only a terminal groove is formed on the top of the cap plate, it is easy to form a terminal groove.

Another feature of this invention is that the electrode terminal 320 is housed in the terminal groove 314 when welding the second protective device 330 to the electrode terminal 320. This prevents the electrode terminal 320 from rotating or moving. Accordingly, the welded portion of the first electrode tab 217, which has been welded to the bottom of the electrode terminal 320, is not affected.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery, comprising:
    an electrode assembly that has a first electrode plate, a second electrode plate, and a separator, all of which are wound together;
    a can that houses the electrode assembly;
    a cap assembly that has a cap plate for sealing a top opening of the can and an electrode terminal that is inserted into a terminal through-hole that is formed on the cap plate;
    a terminal groove that is formed on top of the terminal through-hole to house the electrode terminal;
    a protective device groove spaced at a predetermined distance from the terminal groove;
    a protective device that is housed in the protective device groove with one end connected to the top surface of the electrode terminal; and
    a safety vent that is formed below the protective device groove, the safety vent concave from a bottom surface of the cap plate toward a top surface of the cap plate,
    wherein the protective device is coupled to the electrode terminal via a terminal lead wire, and one end of the terminal lead wire is disposed on the top surface of the electrode terminal.

2. The rechargeable battery of claim 1,
    wherein the head of the electrode terminal in plan view has the shape of a square pole and the terminal groove in plan view has the shape of a square to engage the head of the electrode terminal and prevent it from rotating.

3. The rechargeable battery of claim 1,
wherein the protective device groove has an insulation layer formed on its inner surface.

4. The rechargeable battery of claim 1, wherein the protective device is a positive temperature coefficient (PTC) thermistor, a thermal fuse, or a thermo-breaker.

5. The rechargeable battery of claim 4, wherein the PTC thermistor is a complex system thermistor that comprises:
upper and lower plates made of metal; and
a thin film of a composite material formed by mixing resin and carbon powder that is bonded between the plates.

6. The rechargeable battery of claim 4,
wherein the thermal fuse is made of tin alloy which is actuated at a temperature range of 90-100°.

7. The rechargeable battery of claim 6,
wherein the thermal fuse includes a polyethylene or polyurethane insulation film formed on its surface.

8. The rechargeable battery of claim 4, wherein the thermo-breaker comprises:
a bimetal;
a terminal lead wire that has an end connected to the electrode terminal and another end in contact with the bimetal; and
a case that has a closed space into which the bimetal and the terminal lead wire are inserted from both lateral surfaces thereof, respectively.

9. The rechargeable battery of claim 8,
wherein the bimetal is formed by laminating a metal that has a larger expansion coefficient and is made of an alloy selected from a group consisting of, an alloy of copper and zinc, an alloy of nickel and manganese or iron, an alloy of nickel, chromium, and iron, and an alloy of nickel, manganese, and copper, and another metal that has a smaller expansion coefficient and is made of an alloy of nickel and iron.

10. The rechargeable battery of claim 8,
wherein the bimetal is 0.1 mm-1.0 mm thick.

11. The rechargeable battery of claim 8,
wherein the thermo-breaker has a conductive plate positioned on top of the bimetal.

12. The rechargeable battery of claim 11,
wherein the conductive plate is made of any material selected from a group consisting of copper, nickel, aluminum, and silver.

13. The rechargeable battery of claim 8,
wherein the thermo-breaker has a thin plate-type ceramic PTC thermistor positioned beneath or on top of the bimetal.

14. The rechargeable battery of claim 13,
wherein the ceramic PTC thermistor is made of barium titanate-based oxide.

15. The rechargeable battery of claim 8, wherein the case comprises:
a box-type case body with an open bottom and that has a bimetal hole and a terminal lead wire hole formed on the top of both lateral surfaces thereof, respectively, so that the bimetal and the terminal lead wire penetrate them to be fixed; and
a cover for sealing the bottom of the case body.

16. The rechargeable battery of claim 1,
wherein the terminal groove is integrated with the protective device groove and has a terminal through-hole formed on a side thereof, into which the electrode terminal is inserted, and
wherein the protective device is seated on the other side of the terminal groove.

17. The rechargeable battery of claim 1,
wherein the first electrode plate and second electrode plate are configured as negative and positive electrode plates, respectively, and
wherein the electrode terminal is configured as a negative terminal.

18. The rechargeable battery of claim 1,
wherein the upper surface of the terminal lead wire and the upper surface of the protective device are coplanar.

* * * * *